United States Patent
Prater

(10) Patent No.: US 6,776,274 B2
(45) Date of Patent: Aug. 17, 2004

(54) ASSEMBLY FOR VEHICLE DRIVELINE COMPONENTS

(75) Inventor: Ronald E. Prater, Rochester, MI (US)

(73) Assignee: Koppy Corporation, Orion, MI (US)

( * ) Notice: Subject to any disclaimer, the term of this patent is extended or adjusted under 35 U.S.C. 154(b) by 0 days.

(21) Appl. No.: 10/226,390

(22) Filed: Aug. 23, 2002

(65) Prior Publication Data

US 2004/0035668 A1 Feb. 26, 2004

(51) Int. Cl.$^7$ .............................................. F16D 13/52
(52) U.S. Cl. ........................ 192/70.2; 74/434; 192/112
(58) Field of Search ................................ 192/70.2, 112; 74/433, 449, 434; 29/437, 515, 274, 507, 893.34; 72/105, 334

(56) References Cited

U.S. PATENT DOCUMENTS

| | | | |
|---|---|---|---|
| 3,780,601 A | * | 12/1973 | Dach et al. ................. 475/325 |
| 3,922,932 A | * | 12/1975 | Maurice et al. ............... 74/449 |
| 4,945,782 A | * | 8/1990 | Farrell ........................ 192/70.2 |
| 5,069,575 A | * | 12/1991 | Anderson ........................ 441/6 |
| 5,293,978 A | * | 3/1994 | Reik et al. ............... 192/70.17 |
| 5,305,943 A | | 4/1994 | Walker |
| 5,881,856 A | * | 3/1999 | Prater ........................ 192/70.2 |
| 5,896,970 A | * | 4/1999 | Prater ........................ 192/70.2 |
| 5,906,135 A | * | 5/1999 | Prater ........................... 74/446 |

\* cited by examiner

Primary Examiner—Rodney H. Bonck
(74) Attorney, Agent, or Firm—Carlson, Gaskey & Olds

(57) ABSTRACT

An assembly for use in a vehicle driveline comprises a housing with an inner surface and an outer surface for a vehicle driveline component, a retention element disposed in the housing, and at least one deformation formed on the inner surface operatively in contact with the retention element to retain the vehicle driveline component in the housing. This design and method of manufacture eliminates the need for differently sized spacers because the location of the deformations and the retention element can be tailored relative to the actual location of the components to ensure proper distance between components and the retention element. Moreover, because the spacer may be used as the retention element, the need for a snap ring is eliminated.

14 Claims, 4 Drawing Sheets

ASSEMBLY FOR VEHICLE DRIVELINE COMPONENTS

BACKGROUND OF THE INVENTION

The present invention relates to a vehicle driveline assembly and more particularly to an assembly for housing clutch plates without using a conventional snap ring.

A clutch permits selectively coupling a vehicle engine to the transmission for driving the wheels. The clutch generally comprises a series of vehicle driveline components such as a series of clutch plates. These components are all placed in a housing. A snap ring retains these components within the housing. To receive and hold the position of the snap ring, a slot or retainer typically is formed at a predetermined location on the housing prior to loading the plates into the housing. A spacer is also disposed in the housing to establish a proper distance between the plates to ensure proper clutch operation.

The current method of producing clutch assemblies is inefficient. Due to variations in the distance between the components and the slot for the snap ring, an assembler must measure the distance between components and slot and then select by hand the proper spacer to employ prior to inserting the snap ring into the assembly. A variety of differently sized spacers must be available to the assembler during the manufacturing process. The additional assembly and operator time decreases the economies of clutch assembly.

A need therefore exists for an inexpensive method of producing a transmission assembly without the requirement of maintaining an inventory of a variety of spacers.

SUMMARY OF THE INVENTION

In general terms, this invention is an assembly for use in a vehicle driveline. In a disclosed embodiment of this invention, the assembly comprises a housing with an inner surface and an outer surface. At least one clutch component such as a set of clutch places is supported within the housing. A retention element is disposed in the housing and at least one deformation on the housing operates to contact the retention element and to retain the clutch component in the housing. The preferred retention element is a spacer that ensures proper clutch plate spacing within the housing. A significant advantage provided by this invention is eliminating the need for a snap ring.

In one example, the housing deformation extends into a corresponding portion of the retention element and prevents the retention element from moving axially in either direction within the housing. The housing deformation extends radially inward in one example and radially outward in another version.

In one example, the inventive assembly is manufactured by inserting an appropriate series of clutch plates into the housing. The retention element is axially positioned in the housing to a position that ensures proper distances between the plates. While at this point, a forming tool deforms the housing to maintain the retention element within the housing so that the desired clutch operation is possible. The housing deformations may extend into the retention element to lock its location relatives to the housing.

The inventive method of manufacture eliminates the need for differently sized spacers and snap rings because the housing location of the deformation and the retention element can be tailored relative to the actual location of the stack of components to ensure proper distance between the components during operation after installation in a vehicle driveline. Also, the spacer may be used as the retention element, eliminating the need for a snap ring. In this way, only one sized spacer is required for producing a variety of clutches.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
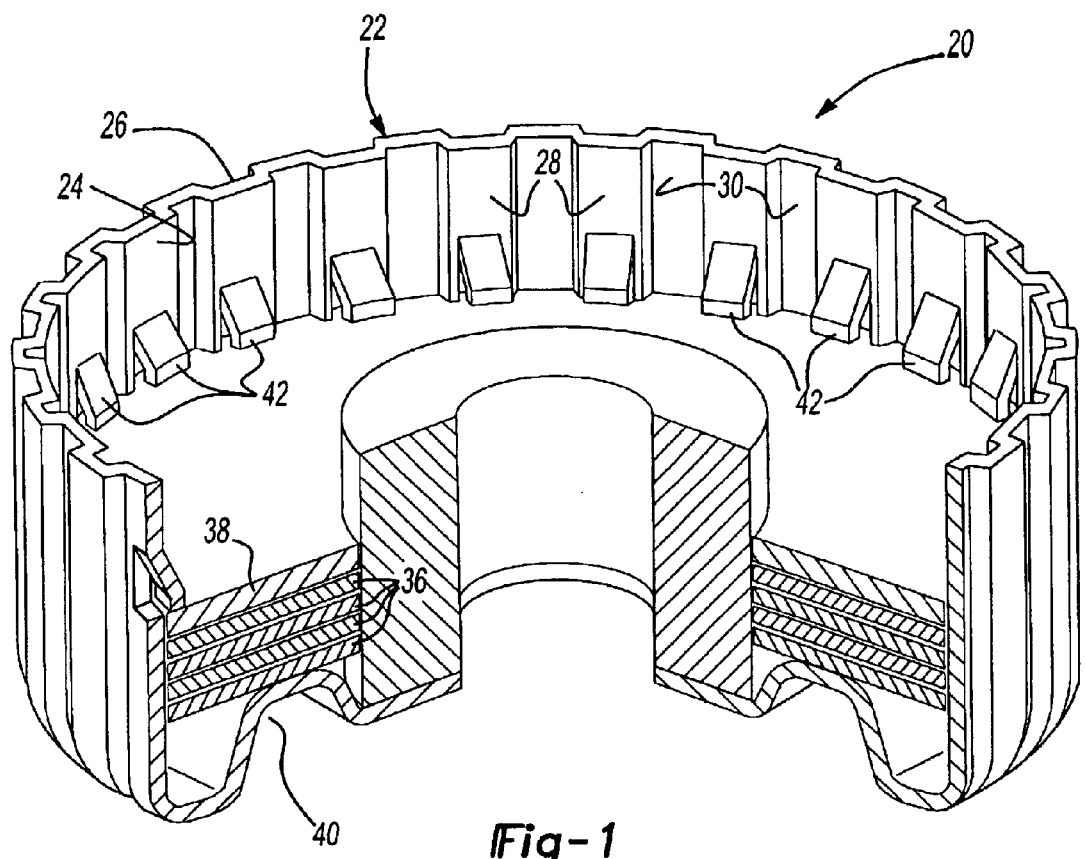
FIG. 1 is a perspective view of an assembly designed according to this invention.

FIG. 1 shows portions of an example assembly 20 for use in a vehicle driveline. The assembly 20 includes a housing 22, which is a clutch housing in the illustrated example. The housing 22 has inner surface 24 and an outer surface 26. The housing 22 includes a series of splines 28 and grooves 30 around the circumference of the housing.

A plurality of clutch plates 36 are supported within the housing between a spacer element 38 and a support portion 40 at one end of the housing. The clutch plates 36 are conventional.

In previous designs of clutch housings, a snap ring groove was provided and a snap ring was inserted to maintain the spacer element 38 and the clutch plates 36 within the housing 22. This invention provides a significant departure from conventional arrangements. This invention eliminates the need for a snap ring.

The housing 22 preferably includes a plurality of deformations 42 that are formed into the housing 22 after the clutch plates 36 and spacer element 38 are in place. In the preferred embodiment, the deformations 42 directly engage the spacer element 38 and maintain the axial position of the spacer element 38 and, therefore, the clutch plates 36 within the housing 22. As will be described below, a variety of configurations are within the scope of this invention for maintaining the position of the spacer element 38 within the housing 22.

Figure 2:
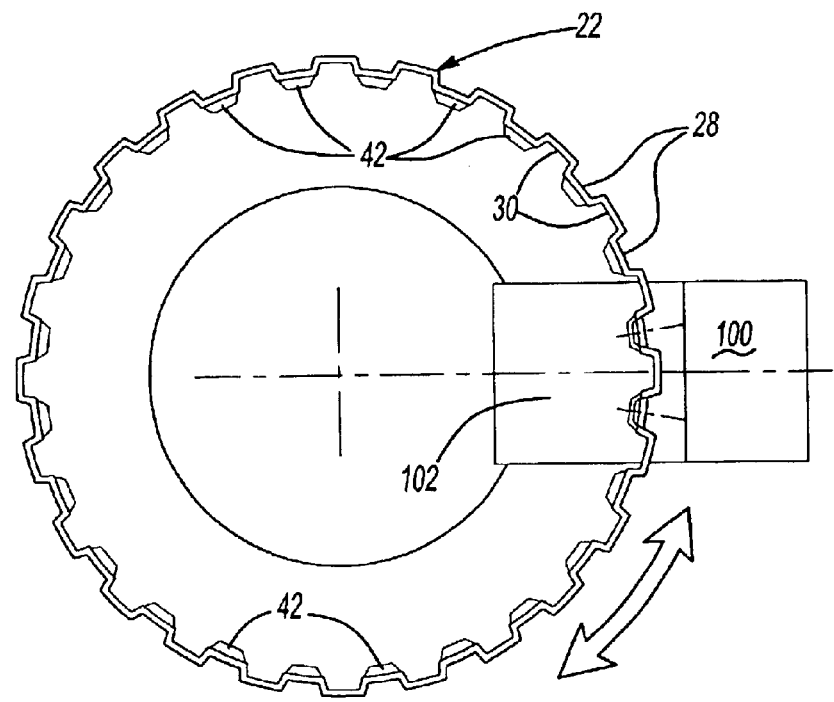
FIG. 2 schematically illustrates a first arrangement of deformations on a housing designed according to this invention.
Figure 3:
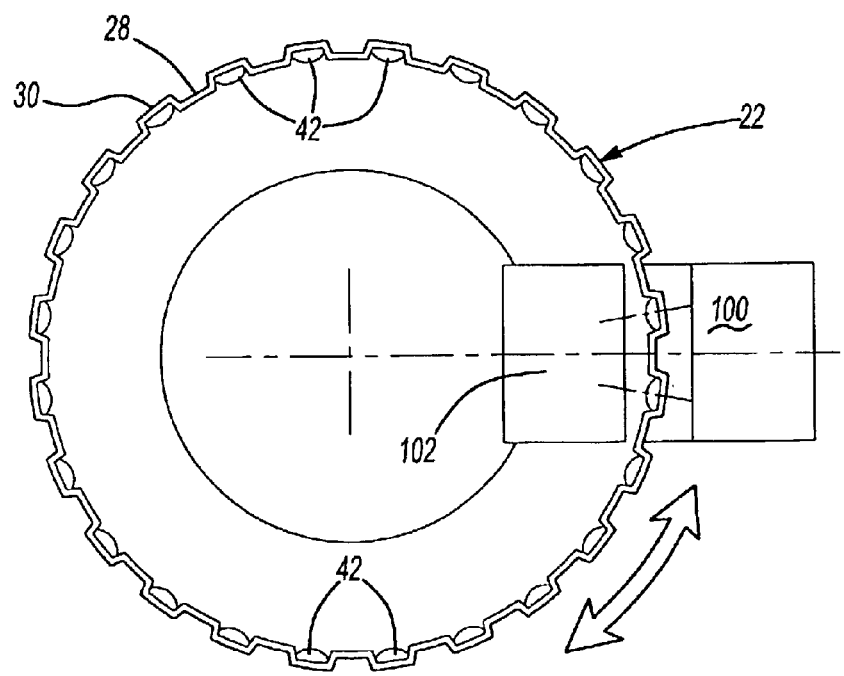
FIG. 3 schematically illustrates another arrangement of deformations.
Figure 4:
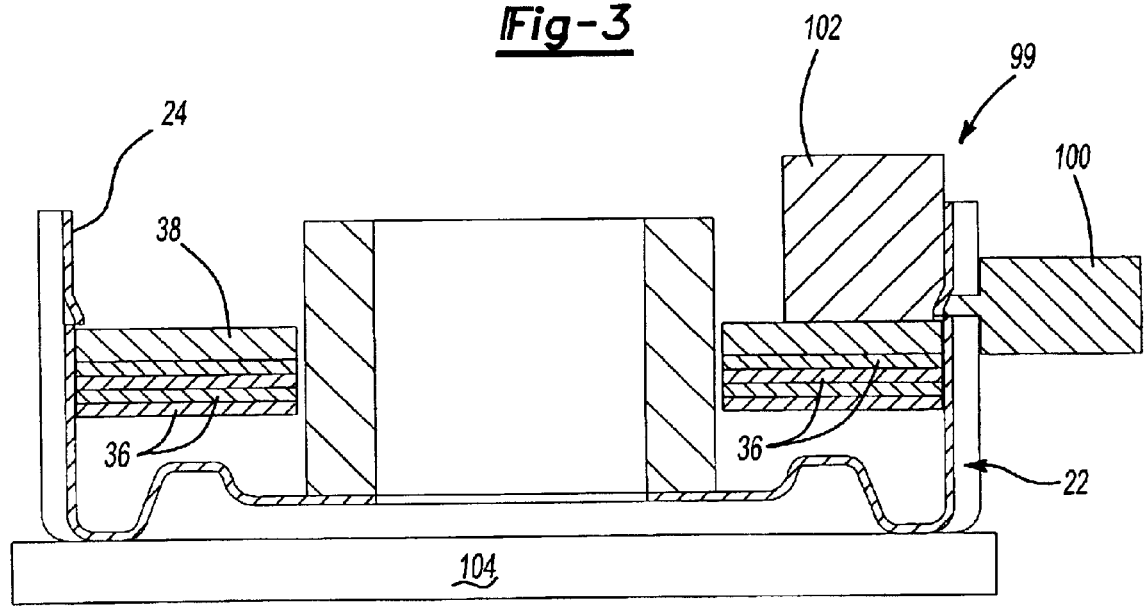
FIG. 4 schematically illustrates tooling designed according to this invention.

As schematically shown in FIG. 2, a plurality of deformations 42 preferably are provided on the inward splines 28 of the housing 22. In another example, shown in FIG. 3, the deformations 42 are provided on the grooves 30 of the housing 22. In the two examples illustrated in FIGS. 2 and 3, the deformations are formed radially inward toward a center of the housing 22. In another example, the deformations are formed radially outward to maintain the position of one or more driveline components around the outer circumference of the housing 22.

FIGS. 4 through 7 schematically illustrate the preferred method of manufacturing the assembly 20. The housing 22 is preformed in a conventional manner. The clutch plates 36 are inserted into the housing 22. A spacer element 38 is then placed on top (according to the drawings) of the set of clutch plates 36 within the housing 22.

A tooling arrangement 99 operates to position the spacer element 38 within the housing 22 into a desired position that maintains a selected arrangement of the clutch plates within the housing 22. The illustrations schematically show a deformation tool portion 100 and a holding portion 102. A base portion preferably supports the clutch housing 22 at one end. The deformation tool 100 and the holding portion 102 preferably are indexed to move together in an axial direction relative to the housing 22.

In the preferred embodiment, the holding portion 102 effectively grabs onto the spacer element 38. The clutch plates 36 preferably are biased toward the end of the housing supported by the base portion. In this position, the clutch plates are all snugly fit together and there is no spacing between them.

Depending on the particular clutch design, the spacer element 38 is then moved in an opposite axial direction relative to the compressed plates. A distance D preferably is established between the spacer element 38 and the plates 36. This spacing D provides the necessary amount of axial play between the clutch plates 36 during normal clutch operation.

The tooling 99 preferably maintains the spacer element 38 at an appropriate axial position within the housing 22 to establish the spacing D that is necessary for proper clutch operation.

Figure 5:
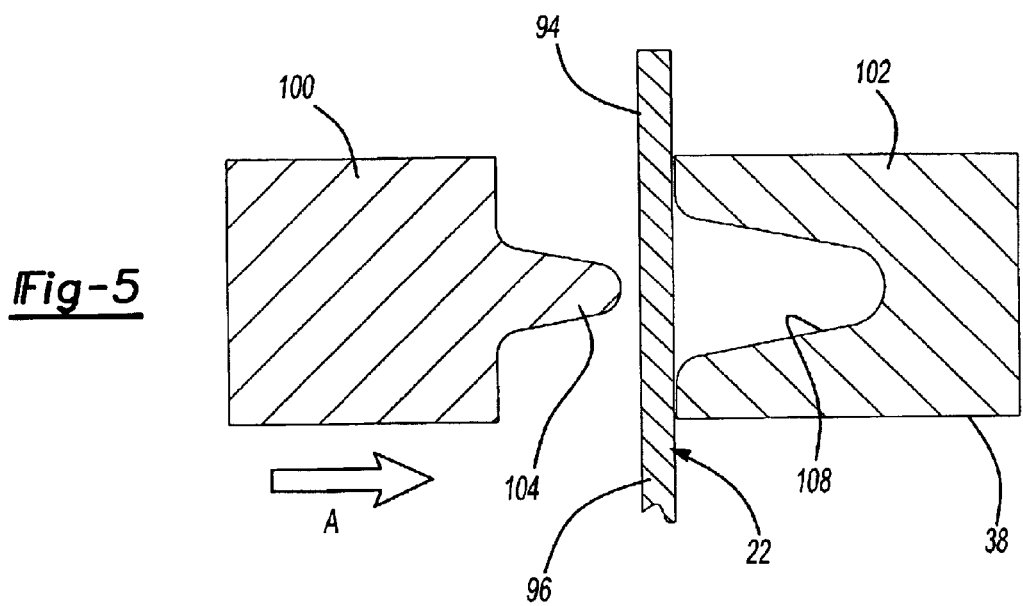
FIG. 5 shows one feature of one example embodiment of this invention.
Figure 6:
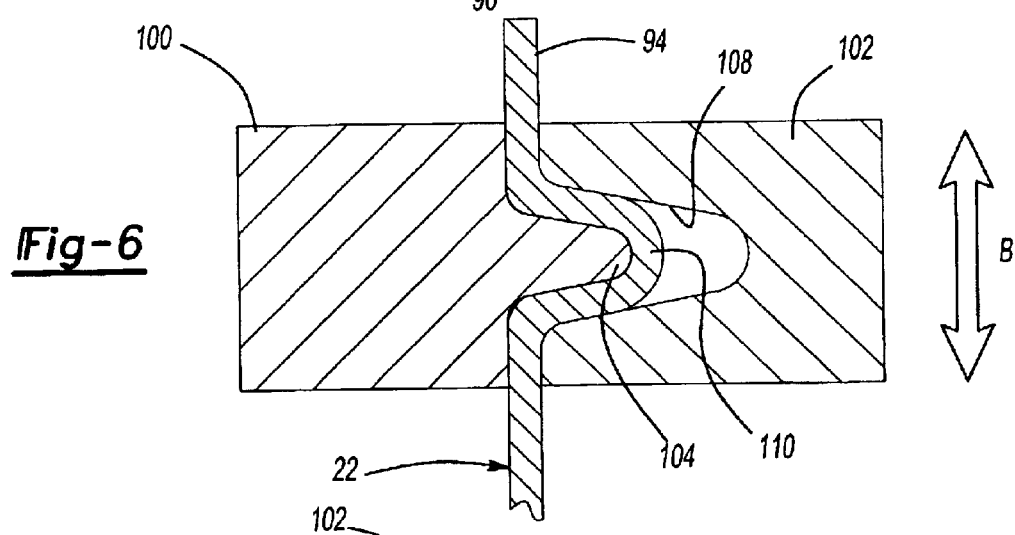
FIG. 6 shows the embodiment of FIG. 5 at one stage of the method of this invention.
Figure 7:
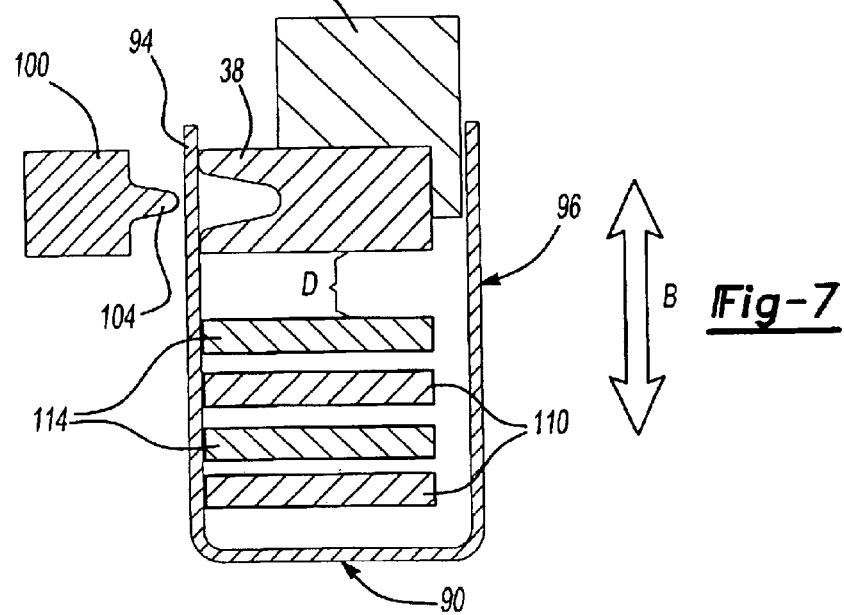
FIG. 7 shows selected portions of the embodiment of FIG. 5.

With the spacer element 38 in the appropriate axial position, the deformation tool portion 100 operates to deform the housing 22 in a manner that maintains the spacer element 38 in the desired position. In the example of FIGS. 5 through 7, the deformation tool 100 includes a punch portion 104 that deforms the housing 22 resulting in a deformation 110 that is received within a corresponding groove 108 that is preformed on the spacer element 38.

In one example, the tooling 99 establishes a single deformation upon each radially inward movement of the tooling portion 100. In another example, multiple deformations are established with each operation of the tooling. The preferred embodiment includes indexing the housing 22 circumferentially about its axis to establish a plurality of deformations around the housing sufficient to maintain the desired axial position of the spacer element 38 within the housing 22 and, therefore, maintaining the desired spacing between the clutch plates. It is believed that a minimum of three deformations equally spaced about the circumference of the housing 22 are required to maintain the spacer element 38 in the desired position. In some examples, every spline 28 includes a deformation for maintaining the axial position of the spacer element 38. In other example implementations of this invention, less then all of the splines 28 (or, alternatively, the grooves 30) include deformations for maintaining the desired axial position of the spacer element 38.

Once the deformation of the housing 22 is complete, the spacer element 38 operates as the retention element to maintain the clutch plates 36 within the housing 22 throughout the life of the eventual clutch assembly. There is no need for an operator on the assembly line to insert any further spacer elements or a snap ring as was done in the past. Therefore, this invention provides significant economies in the manufacturing process because the assembly 20 is premade and ready for any further assembly and installation onto a vehicle driveline as needed without requiring an operator to select from among various spacer elements and to insert a snap ring to maintain them within the housing.

Figure 8:
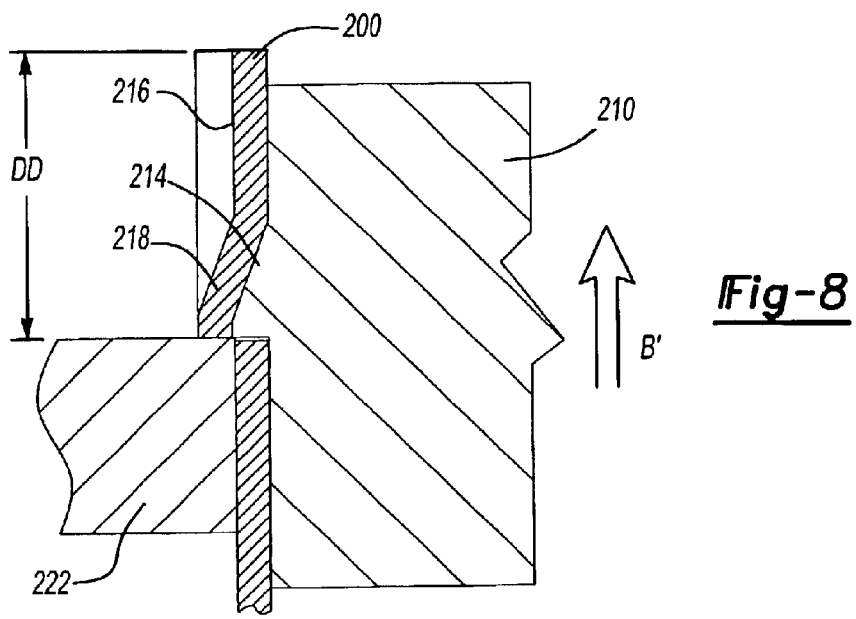
FIG. 8 schematically illustrates one example retention arrangement.

As seen in FIG. 8, the tool 210 may also be aligned so that punch 214 forms a deformation 218 on the inner surface 216 of the housing 220 above the retention element 222. This configuration prevents retention element 222 from moving in the direction of arrow B' but permits the retention element to move in the opposite direction. During operation of the clutch, the retention element 222 may create a force in the direction of arrow B' on deformation 218. Accordingly, the lip of housing 220 must extend to a minimum distance DD above retention element 222 to prevent the buckling of lip 220. Also shown by FIG. 8 is the option to pierce housing 220 so that deformation 218 is a lanced portion of the housing.

Figure 9:
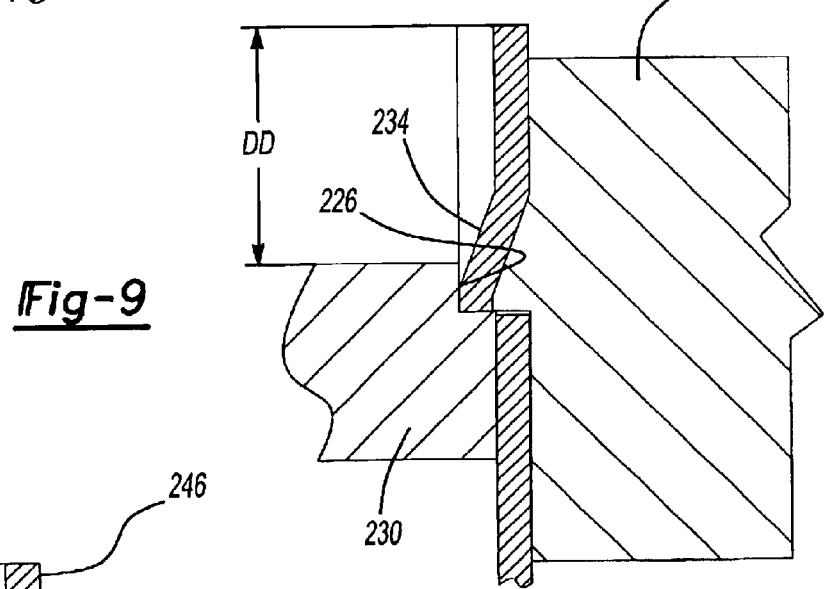
FIG. 9 schematically illustrates another retention arrangement.

FIG. 9 shows another embodiment of this invention. In this instance, notch 226 is formed at the top edge of retention element 230. Deformation 234 is extended into notch 226 by tool 238. This arrangement facilitates placing the spacer element 230 closer to the open end of the housing without compromising the amount of material above the deformation 234 (according to the drawing).

Figure 10:
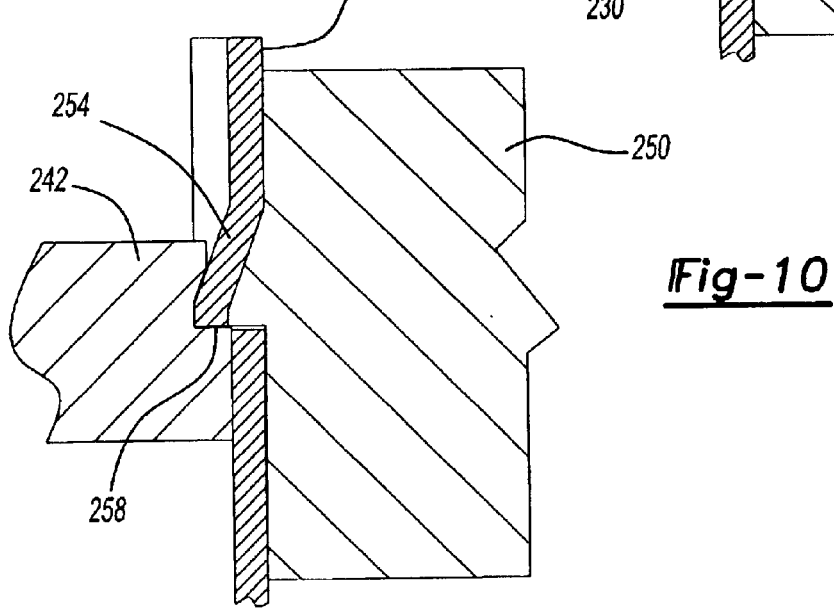
FIG. 10 schematically illustrates another retention arrangement.

The examples of FIGS. 10 and 6 include locking an axial position of the spacer retention element. In the examples of FIG. 8 and 9, axial movement is possible to an extent. Given this description those skilled in the art will be able to select the most appropriate arrangement for their particular situation.

While varying embodiments of the prevent invention are shown, they all share the unique feature of deforming the housing after the spacer or retention element is inserted adjacent the clutch plates such that the retention element is held in place and proper clutch plate spacing is established. By employing the above method of manufacture, the location of the retention element relative to the set of plates is fixed into a desired position. In this way, spacers of varying sizes are no longer required. Additionally, the entire process is easily automated and manual snap ring insertion is eliminated, greatly improving the efficiency of the production of clutch housing assemblies.

The preceding description is exemplary rather than limiting. Modifications and variations are possible in light of the above teachings. Workers skilled in the art may recognize that certain modifications are possible that come within the scope of this invention. Hence, the invention may be practiced otherwise than as specifically described above. For this reason the following claims should be studied to determine the true scope of legal protection given to this invention.

What is claimed is:

1. An assembly for use in a vehicle driveline, comprising:
a housing with an inner surface and an outer surface;
at least one driveline component received within the housing;
a retention element having a rigid outside dimension disposed in said housing; and
at least one deformation on said housing providing a retention dimension that cooperates with said rigid outside dimension to retain said retention element and said driveline component in said housing, said deformation extending into a portion of said retention element and having an edge that contacts said retention element, said housing having an edge immediately axially adjacent said deformation edge such that no material is removed from said housing in the vicinity of said deformation.

2. The assembly of claim 1 wherein said at least one deformation forms a ridge.

3. The assembly of claim 1 including a plurality of arcuately spaced deformations on said housing.

4. The assembly of claim 1 wherein said at least one deformation is a lanced portion of said housing.

5. The assembly of claim 1 including a plurality of splines on said inner surface of said housing and wherein said at least one deformation includes a plurality of deformations each on a selected one of the plurality of splines.

6. The assembly of claim 1 including at least one groove on said inner surface of said housing and wherein said at least one deformation is on said at least one groove.

7. The assembly of claim 1 wherein said at least one deformation extends radially inward toward an interior portion of said housing.

8. The assembly of claim 1 wherein said retention element is generally annular and has an outside dimension that does not change, the outside dimension being smaller than an interior dimension defined by the housing inner surface.

9. The assembly of claim 1 wherein said retention element is a spacer.

10. The assembly of claim 1 wherein said housing is a clutch housing and said driveline component comprises clutch plates.

11. The assembly of claim 1 including a plurality of splines interspersed with a plurality of grooves.

12. The assembly of claim 1, wherein the retention element includes a notched portion and wherein the edge of the deformation contacts a surface within the notched portion.

13. The assembly of claim 12, wherein the deformation is received within the notched portion to prevent axial movement in one direction.

14. The assembly of claim 12, wherein the deformation is received into the notched portion in a manner that prevents axial movement of the retention element in two directions.

* * * * *